United States Patent
Lee et al.

(10) Patent No.: US 7,592,283 B2
(45) Date of Patent: Sep. 22, 2009

(54) METHOD OF REGENERATING HONEYCOMB TYPE SCR CATALYST BY AIR LIFT LOOP REACTOR

(75) Inventors: Jung Bin Lee, Daejeon (KR); Tae Won Lee, Deajeon (KR); Kwang Chul Song, Daejeon (KR); In Young Lee, Daejeon (KR)

(73) Assignee: Korea Electric Power Corporation (KR)

( * ) Notice: Subject to any disclaimer, the term of this patent is extended or adjusted under 35 U.S.C. 154(b) by 462 days.

(21) Appl. No.: 11/262,159

(22) Filed: Oct. 28, 2005

(65) Prior Publication Data

US 2006/0094587 A1    May 4, 2006

(30) Foreign Application Priority Data

Oct. 29, 2004    (KR) .................. 10-2004-0087386

(51) Int. Cl.
*B01J 38/60* (2006.01)
*B01J 38/04* (2006.01)

(52) U.S. Cl. .................... 502/27; 502/34; 502/514; 502/516; 502/517

(58) Field of Classification Search ............ 502/27, 502/514, 516, 517, 34; *B01J 20/34*
See application file for complete search history.

(56) References Cited

U.S. PATENT DOCUMENTS

| | | | | |
|---|---|---|---|---|
| 4,466,947 A | * | 8/1984 | Imanari et al. | 423/239.1 |
| 5,227,356 A | * | 7/1993 | Hess et al. | 502/217 |
| 5,707,574 A | * | 1/1998 | Domesle et al. | 264/432 |
| 5,837,635 A | * | 11/1998 | Kischkewitz et al. | 502/24 |
| 6,051,198 A | * | 4/2000 | Sano et al. | 423/240 S |
| 6,162,524 A | * | 12/2000 | Patchett et al. | 428/116 |
| 6,395,665 B2 | * | 5/2002 | Nojima et al. | 502/25 |
| 6,777,369 B1 | * | 8/2004 | Kuroda et al. | 502/211 |

FOREIGN PATENT DOCUMENTS

KR    1020020071244    * 11/2002

* cited by examiner

*Primary Examiner*—Timothy C Vanoy
*Assistant Examiner*—Daniel Berns
(74) *Attorney, Agent, or Firm*—Cantor Colburn LLP

(57) ABSTRACT

Provided is a method of regenerating a honeycomb type SCR catalyst which is used in selective catalytic reduction (SCR), comprising treating a waste honeycomb type SCR catalyst used in an industrial boiler with a mixed solution containing 0.1 M to 1.0 M $H_2SO_4$, 0.005 M to 0.1 M $NH_4VO_3$ and 0.005 M to 0.1 M $5(NH_4)_2O.12WO_3.5H_2O$ in an air lift loop reactor.

3 Claims, 1 Drawing Sheet

METHOD OF REGENERATING HONEYCOMB TYPE SCR CATALYST BY AIR LIFT LOOP REACTOR

BACKGROUND OF THE INVENTION

1. Field of the Invention

The present invention relates to a method of regenerating a honeycomb type SCR catalyst which is used in selective catalytic reduction (hereinafter, referred to as SCR). More specifically, the present invention relates to a method of regenerating a honeycomb type SCR catalyst using an air lift loop reactor, by which a remarkably reduced activity of the catalyst due to contamination resulting from poisoning by heavy metal components contained in fly ash produced during a combustion process of fuels in thermoelectric power stations and solid deposition is recovered to a level of catalytic activity before contamination thereof.

2. Description of the Related Art

A removal method of nitrogen oxides ($NO_x$) most widely adopted in large thermoelectric power stations at present is an SCR technique that decomposes nitrogen oxides to be removed into harmless nitrogen and water via a catalytic reaction using ammonia as a reducing agent. The catalysts used in such a method, i.e., SCR catalysts, are of honeycomb-shape, and almost all use titanium dioxide ($TiO_2$) as a supporting material and additionally contain organic and inorganic binders including vanadium (1 to 3%) and tungsten (10 to 20%) as a main ingredient.

Such SCR catalysts experience a continuous decrease in catalytic activity thereof due to poisoning of fly ash contained in exhaust gases and solid deposition, and as a result, their lifetimes are exhausted after use for a predetermined period of time (about 2 to 5 years).

Korean Patent Publication Laid-open No. 2001-0078309 discloses a method of regenerating a catalyst involving cleaning a waste catalyst using an anionic surfactant, non-ionic surfactant, a metal compound or the like. Korean Patent Publication Laid-open No. 2001-0072628 discloses a method of regenerating a noble metal catalyst involving impregnating a catalyst, in which at least one noble metal is supported on an amorphous silica alumina support, with an acid, and subjecting the impregnated catalyst to reduction or oxidation at a temperature of more than 200° C. Korean Patent Publication Laid-open No. 2004-0042667 includes a method of regenerating a catalyst involving washing a surface of a waste catalyst with an alkaline solution as a pretreatment, abrading to remove a surface of the catalyst molded material with an abrasive, and as a last post-treatment, washing the catalyst material with an acid solution and water. U.S. Pat. No. 6,387,836 has proposed a method of regenerating a waste catalyst involving subjecting a waste SCR catalyst to chemical cleaning using fully desalinated water and then drying the catalyst with water-free compressed air or oil.

SUMMARY OF THE INVENTION

As a result of extensive and intensive research and studies, the present inventors have found that a waste honeycomb type SCR catalyst having a remarkably reduced activity can be recovered to its initial catalytic activity state before contamination, via circulation/flow of a mixed solution composed of an sulfuric acid solution and an active material in an air lift loop reactor.

Therefore, the present invention has been made in view of the above problems, and it is an object of the present invention to provide a method of regenerating a honeycomb type SCR catalyst, having superior removal efficiency of nitrogen oxides, capable of being applied to a reactor having the honeycomb type SCR catalyst mounted thereon and capable of regenerating a waste catalyst without a separate treatment.

In accordance with the present invention, the above and other objects can be accomplished by the provision of a method of regenerating a honeycomb type SCR catalyst, comprising treating a waste honeycomb type SCR catalyst used in an industrial boiler with a mixed solution containing 0.1 M to 1.0 M $H_2SO_4$, 0.005 M to 0.1 M $NH_4VO_3$ and 0.005 M to 0.1 M $5(NH_4)_2O.12WO_3.5H_2O$ in an air lift loop reactor.

Preferably, a concentration of $NH_4VO_3$ and $5(NH_4)_2O.12WO_3.5H_2O$ may be in a range of 0.025 M to 0.05 M.

The above mixed solution may be used by mixing water: $H_2SO_4$: $NH_4VO_3$: $5(NH_4)_2O.12WO_3.5H_2O$ in a volume ratio of 98:1:0.5:0.5 to 85:9:3:3, and preferably 95:3:1:1.

BRIEF DESCRIPTION OF THE DRAWINGS

The above and other objects, features and other advantages of the present invention will be more clearly understood from the following detailed description taken in conjunction with the accompanying drawing, in which.

DESCRIPTION OF THE PREFERRED EMBODIMENTS

Figure 1:
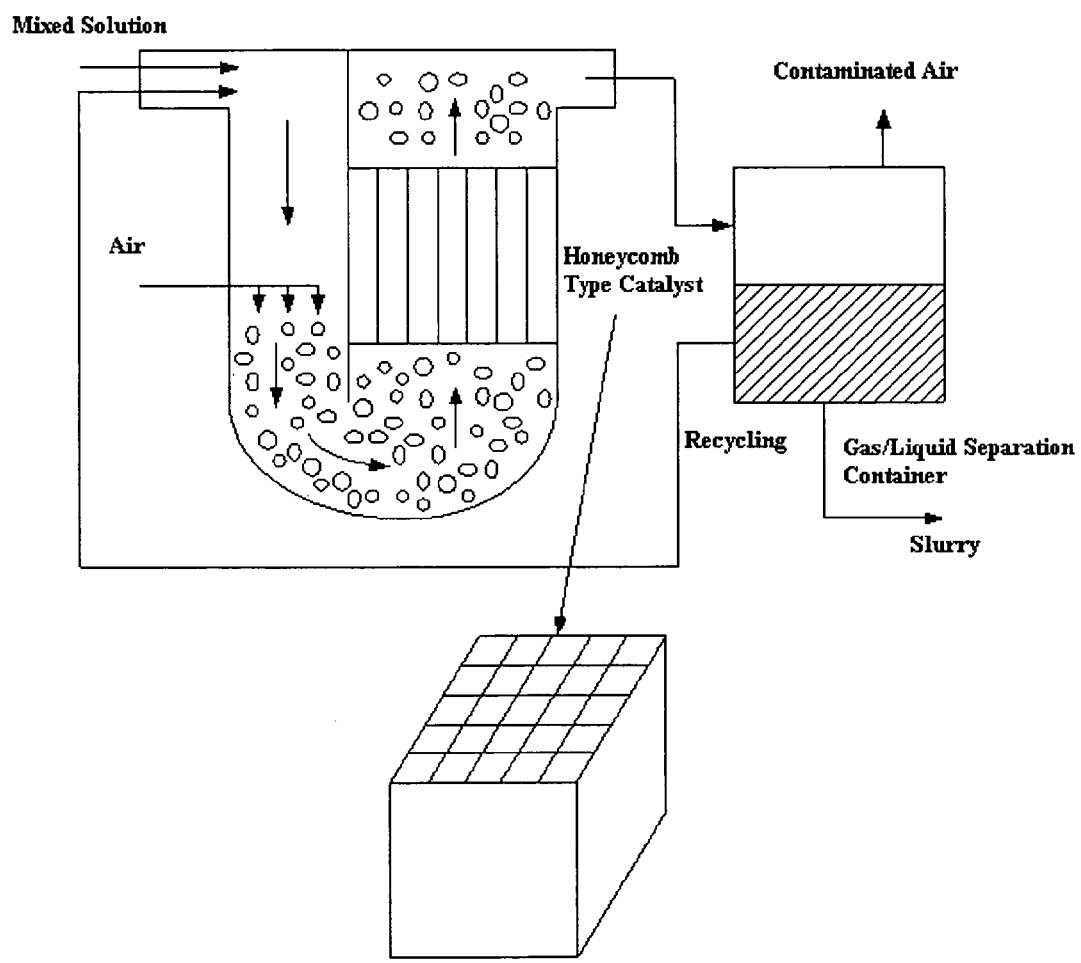
FIG. 1 is a view schematically showing an air lift loop reactor in which a honeycomb type SCR catalyst is regenerated, according to the present invention.

Hereinafter, the present invention will be described in more detail.

A selective catalytic reduction (SCR) catalyst is of a honeycomb-shape and is based on a titanium dioxide ($TiO_2$) supporting material wherein active metal compounds such as vanadium pentoxide ($V_2O_5$) and tungsten trioxide ($WO_3$) are uniformly distributed. The present invention employs a honeycomb-type SCR catalyst having a cell density of 20 to 200 cpsi (cells per square inch) and composed of vanadium, tungsten, barium, manganese or a mixture thereof supported on the titanium dioxide ($TiO_2$) supporting material.

In the mixed solution in accordance with the present invention, a solution of 0.1 M to 1.0 M $H_2SO_4$ cleans and elutes alkali metals (for example, K and Na) and alkaline earth metals (for example, Mg and Ca) or a mixture thereof, which have weakened an active site of the catalyst. Where a concentration of the $H_2SO4$ solution is less than 0.1 M, sufficient cleaning effects cannot be obtained. In contrast, where a concentration of the $H_2SO_4$ solution is greater than 1.0 M, the active ingredients, i.e., vanadium and tungsten ingredients are undesirably excessively eluted.

Meanwhile, alkali metal compounds can be removed using the $H_2SO_4$ solution, while water-insoluble compounds, which may be penetrated into pores of some catalysts during a washing process, are removed by generating large amounts of micro bubbles using an air lift loop reactor.

FIG. 1 is a view schematically showing an air lift loop reactor in which a honeycomb type SCR catalyst is regenerated, according to the present invention.

As the air lift loop reactor, a loop-type reactor may be employed which uses the mixed solution of the present invention as a flow material, generates bubbles having a size of less than 500 μm and discharges contaminated gases to the outside. Herein, the size of bubble is preferably less than 500 μm, because a larger size of the bubble may interfere with flowability of the solution and reduce cleaning effects.

Ammonium vanadate $NH_4VO_3$ and ammonium paratungstate $5(NH_4)_2O.12WO_3.5H_2O$ constituting the mixed solution of the present invention is added to replace the active ingredients which were exhausted or the active materials which were partially eluted during the cleaning process. Ammonium vanadate $NH_4VO_3$ and ammonium paratungstate $5(NH_4)_2O.12WO_3.5H_2O$ may be used in a concentration of 0.005 M to 0.1 M and preferably 0.025 M to 0.05 M.

Vanadium pentoxide, the active ingredient of the honeycomb type SCR catalyst, exhibits a very low removal rate of $NO_x$ when content thereof is less than 1.0% by weight. In contrast, if a content is greater than 10% by weight, vanadium pentoxide exhibits a rapid decrease in removal rate of $NO_x$ at temperature of more than 400° C. and promotes oxidation of $SO_2$. Therefore, vanadium pentoxide should be supported in an amount ranging from 1.0 to 10% by weight. As such, it is preferred that the concentration of ammonium vanadate $NH_4VO_3$ as an additive should not exceed 0.1 M.

In addition, since tungsten, the active ingredient of the honeycomb type SCR catalyst, may also promote oxidation of sulfur dioxide if content thereof exceeds 10% by weight, and is very expensive. As such, from an economical point of view, it is preferred that the concentration of ammonium paratungstate should not exceed 0.1 M.

The mixed solution for regenerating the honeycomb type SCR catalyst in accordance with the present invention is prepared by mixing water: $H_2SO_4:NH_4VO_3:5(NH_4)_2O.12WO_3.5H_2O$ preferably in a volume ratio of 98:1:0.5:0.5 to 85:9:3:3 and more preferably 95:3:1:1, in terms of active ingredient elution and cleaning effects.

EXAMPLES

Now, the present invention will be described in more detail with reference to the following examples. These examples are provided only for illustrating the present invention and should not be construed as limiting the scope and spirit of the present invention.

Examples 1 Through 5

Regeneration Experiment of Waste Honeycomb Type SCR Catalyst Using $H_2SO_4$ solution The present invention has selected a waste catalyst, denitrification efficiency of which was lowered to about 45% (based on 350° C.) in SCR facility of thermoelectric power stations, as a test catalyst. The above catalyst is a commercially available honeycomb type catalyst having a cell density of 20 cpsi (cells per square inch), prepared by supporting 2% $V_2O_5$ and 5% $WO_3$ on a titanium dioxide support. The test catalyst was made into a module form having a size of 150 mm ×150 mm ×600 mm and was mounted on an air lift loop reactor which was then subjected to regeneration test of catalytic activity.

0.1 M to 1.0 M $H_2SO_4$ solutions were prepared using pure water at room temperature, respectively, and the test catalysts which were mounted on the air lift loop reactor as shown in FIG. 1 were cleaned with these solutions for about 60 min.

Concentrations of metal materials in the cleaning solutions, which were eluted from test catalysts after cleaning, were measured. The results thus obtained are shown in Table 1 below. After cleaning, concentrations of potassium (K), vanadium (V), tungsten (W) metal components eluted from test catalysts were analyzed by Atomic Absorption Spectroscopy (AAS) and Perkin-Elmer Plasma 2000 Inductively Coupled Plasma-Atomic Emission Spectrometry (ICP-AES).

It can be seen that as the concentration of the sulfuric acid solution is increased, alkali compounds (K and Na), which are main causes of reduction in activity of the SCR catalyst, are more eluted. However, where the concentration of the sulfuric acid solution is higher than 0.5 M, active ingredients of the catalyst, i.e., vanadium (V) and tungsten (W) were also shown to be partially eluted.

TABLE 1

Concentrations of eluted metal materials with respect to concentrations of $H_2SO_4$

| Example | Conc. of cleaning solution | K (wt %) | Na (wt %) | V (Wt %) | W (wt %) |
|---|---|---|---|---|---|
| 1 | 0.01M $H_2SO_4$ | 0.01 | 0.02 | — | — |
| 2 | 0.25M $H_2SO_4$ | 0.04 | 0.06 | — | — |
| 3 | 0.50M $H_2SO_4$ | 0.14 | 0.19 | 0.05 | 0.001 |
| 4 | 0.75M $H_2SO_4$ | 0.14 | 0.20 | 0.18 | 0.003 |
| 5 | 1.00M $H_2SO_4$ | 0.15 | 0.21 | 0.20 | 0.003 |

Examples 6 Through 11

$NO_x$ Removal Activity of Honeycomb Type SCR Catalyst Cleaned with $H_2SO_4$ Solution Honeycomb type SCR catalysts regenerated in the same manner as Examples 1 through 5 were washed with water, dried with high-temperature air of about 200° C. and mounted on a small honeycomb-type catalytic reactor, followed by measuring $NO_x$ removal activity of the catalyst. Herein, 200 ppm of $NO_x$ simulated gas was passed through the reactor at a reaction temperature of 350° C., space velocity of 4000 $hr^{-1}$ and 0.9 $NH_3/NO_x$ molar ratio and then activity of the SCR catalyst was measured. The results thus obtained are shown in Table 2 below.

TABLE 2

$NO_x$ removal activity of honeycomb type SCR catalyst regenerated by $H_2SO_4$ solution

| Example | Test catalyst | $NO_x$ removal rate (%) |
|---|---|---|
| 6 | Waste catalyst | 45 |
| 7 | 0.01M $H_2SO_4$ regenerated catalyst | 55 |
| 8 | 0.25M $H_2SO_4$ regenerated catalyst | 72 |
| 9 | 0.50M $H_2SO_4$ regenerated catalyst | 82 |
| 10 | 0.75M $H_2SO_4$ regenerated catalyst | 80 |
| 11 | 1.00M $H_2SO_4$ regenerated catalyst | 75 |

As can be seen from the results of Examples 6 through 11, $NO_x$ removal activity of the catalyst regenerated by a 0.5 M $H_2SO_4$ solution was highest. The catalysts regenerated by more than 0.75 M $H_2SO_4$ solution exhibit a decrease in $NO_x$ removal activity because vanadium, the active ingredient of the catalyst, was partially eluted, thereby thus reducing active sites of the catalyst.

Examples 12 through 15

$NO_x$ Removal Activity of Honeycomb Type SCR Catalyst Regenerated by $H_2SO_4$ +$NH_4VO_3$+$5(NH_4)_2O.12WO_3.5H_2O$ Mixed Solution In order to increase activity of a honeycomb type SCR catalyst, a solution of $NH_4VO_3$ and $5(NH_4)_2O.12WO_3.5H_2O$ was added to a 0.5 M $H_2SO_4$ solution and an air lift loop reactor was operated. Then, the $NO_x$ removal rate of the catalyst was measured in the same manner as Examples 6 through 11.

TABLE 3

$NO_x$ removal activity of honeycomb type SCR catalyst regenerated by a mixed solution

| Example | Flow material (mixed solution) Volume ratio - Water:$H_2SO_4$:$NH_4VO_3$:$5(NH_4)_2O.12WO_3.5H_2O$ = 95:3:1:1 | $NO_x$ removal rate (%) |
|---|---|---|
| 12 | 0.5M $H_2SO_4$ + 0.005M $NH_4VO_3$ + 0.005M $5(NH_4)_2O.12WO_3.5H_2O$ | 85 |
| 13 | 0.5M $H_2SO_4$ + 0.025M $NH_4VO_3$ + 0.025M $5(NH_4)_2O.12WO_3.5H_2O$ | 89 |
| 14 | 0.5M $H_2SO_4$ + 0.05M $NH_4VO_3$ + 0.05M $5(NH_4)_2O.12WO_3.5H_2O$ | 95 |
| 15 | 0.5M $H_2SO_4$ + 0.075M $NH_4VO_3$ + 0.075M $5(NH_4)_2O.12WO_3.5H_2O$ | 96 |

As can be seen from the results of Examples 12 through 15, addition of $NH_4VO_3$ and $5(NH_4)_2O.12WO_3.5H_2O$ to a 0.5 M $H_2SO_4$ solution significantly increased activity of the waste SCR catalyst.

As described above, when a waste honeycomb type SCR catalyst was regenerated by the air lift loop reactor, according to the regeneration method of the present invention, the activity of the SCR catalyst can be recovered to a level of catalytic activity before contamination, and thus the present invention is economically advantageous and environmentally friendly via recycling of the catalyst and treatment of waste catalyst.

In particular, since SCR facilities are widely used as a method capable of reducing amounts of nitrogen oxides produced upon burning of fuels in thermoelectric power facilities and incinerators and thus demand upon catalysts is significantly increased, it is expected that large amounts of waste catalysts will be produced in the near future. Therefore, regeneration of waste catalyst enables maximized reduction of catalyst replacement costs and can thus provide enormous economic benefits.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of regenerating a waste honeycomb type SCR catalyst used in an industrial boiler, the method comprising:
    placing the waste honeycomb type SCR catalyst in an air lift loop reactor having a gas/liquid separation container, the air lift loop reactor generating bubbles having a size of less than 500 µm; and
    circulating a mixed solution containing 0.1 M to 1.0 M $H_2SO_4$, 0.005 M to 0.1 M $NH_4VO_3$ and 0.005 M to 0.1 M $5(NH_4)_2O.12WO_3.5H_2O$ in the air lift loop reactors, the mixed solution passing through the waste honeycomb type SCR catalyst along with the generated bubbles to regenerate the SCR catalyst and produce contaminated gases,
    wherein the contaminated gases are trapped in the bubbles, separated in the gas/liquid separation container, and discharged to outside from the air lift loop reactor.

2. The method according to claim 1, wherein the concentration of $NH_4VO_3$ is in the range of 0.025 M to 0.05 M.

3. The method according to claim 1, wherein the concentration of $5(NH_4)_2O.12WO_3.5H_2O$ is in the range of 0.025 M to 0.05 M.

\* \* \* \* \*